No. 631,290. Patented Aug. 22, 1899.
W. C. FISH.
ELECTRIC METER.
(Application filed Apr. 7, 1899.)

(No Model.)

WITNESSES.
A. H. Abell.
A. F. Macdonald.

INVENTOR.
Walter C. Fish,
by Albert G. Davis
Atty.

UNITED STATES PATENT OFFICE.

WALTER C. FISH, OF LYNN, MASSACHUSETTS, ASSIGNOR TO THE GENERAL ELECTRIC COMPANY, OF NEW YORK.

ELECTRIC METER.

SPECIFICATION forming part of Letters Patent No. 631,290, dated August 22, 1899.

Application filed April 7, 1899. Serial No. 712,039. (No model.)

*To all whom it may concern:*

Be it known that I, WALTER C. FISH, a citizen of the United States, residing at Lynn, county of Essex, State of Massachusetts, have invented certain new and useful Improvements in Electric Meters, (Case No. 1,018,) of which the following is a specification.

My invention relates to devices for measuring electricity, whether wattmeters or ammeters, and particularly to those of the integrating type. I have here illustrated it in connection with the well-known Thomson recording-wattmeter, though it is obvious that it may be applied to many other devices.

The speed of an integrating-meter should be at all loads directly proportional to the energy registered. This result can be accomplished if friction can be eliminated. The effect of friction is to render a meter slow on low loads and frequently to prevent the meter from starting with loads of only one or two lamps. Various devices have been devised for preventing or minimizing the effect of friction, and my present invention comprises a new method of accomplishing this greatly-desired result.

Figure 1:
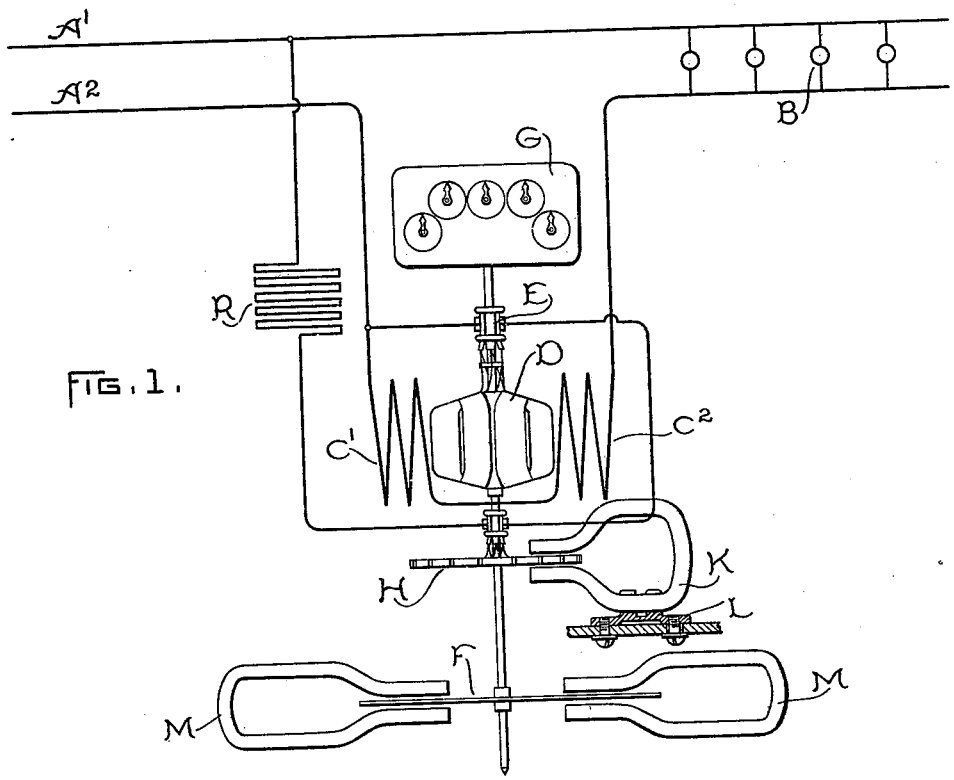
Figure 2:
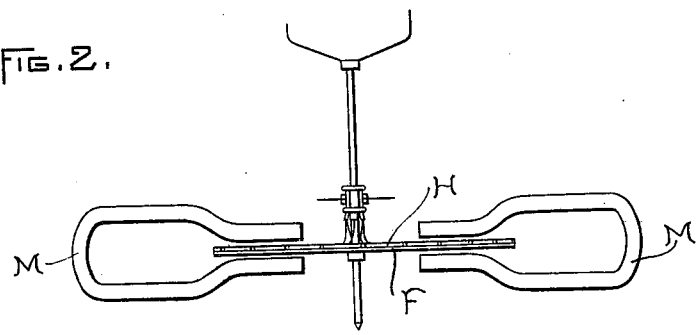

In the drawings attached to this specification, Figure 1 is a diagram of my invention as applied to a Thomson wattmeter, and Fig. 2 is a diagram of a modification.

Referring more particularly to Fig. 1, A' A² are mains carrying current to the lamps B B. Inserted in series with the mains A² are the series coils C' C², through which all or a definite portion of the current must pass, as is well understood in the art. These coils constitute the field-magnets of a small motor, the armature of which is connected in shunt across the lines, but in series with the resistance R. This armature is shown at D in the drawings, and the commutator is shown at E. A damping-disk F, acting in conjunction with the magnets M M, furnishes the retarding torque, and a counter G serves to register the number of revolutions of the armature. This is the ordinary construction of the Thomson recording-wettmeter, which is well known in the art. Such a meter unless supplied with some special starting device will fail to start on very low loads and will in general be slightly inaccurate. In order to furnish a torque just sufficient to overcome friction, I add an auxiliary winding or armature H, which is preferably placed, as shown in the drawings, in series with the main armature D and with the resistance R. This armature works in the field of a permanent magnet K or in some other constant field, and thus furnishes a torque which is substantially constant at all loads. This torque is adjusted by movement of the magnet K, so as to be just sufficient to neutralize or a little less than neutralize the starting friction of the meter—in other words, so as to keep the meter just on the point of starting when no current is flowing in the series coils C' C². This adjustment of the magnet K is obtained by loosening the clamp L, as will be apparent from the drawings.

As is well known, running friction is less than standing friction, and to a certain extent my invention compensates for this fact, since as the speed of the meter rises the counter electromotive force increases and the current flowing in the armature H decreases. This effect is, however, very small if the meter is properly designed, since in the ordinary Thomson wattmeter the counter electromotive force of the armature is almost negligible in comparison with the resistance in series with the armature. It is possible by properly proportioning the resistance R, the counter electromotive force of the armature D, and the field of the magnet K to produce a meter which shall start on one lamp and register accurately at all loads.

It will be obvious that any suitable source of magneto-motive force may be used to create the field in which the armature H revolves. This will be evident from Fig. 2, in which I have shown the armature H as wound upon the damping-disk F, so that both the starting torque and the retarding torque are secured from the same magnets M M, which are, as usual, adjustably mounted. Obviously various other arrangements may be used, since the armature H wherever it may be placed need not necessarily be supplied with current in series with the armature D. I have, however, illustrated in the drawings the best method known to me of practicing my invention, so as to enable those skilled in the art to make and use the same; but I do not confine myself to the particular forms shown and described.

Having thus described my invention, what I claim as new, and desire to secure by Letters Patent of the United States, is—

1. The combination with an integrating-meter, of an additional armature arranged to furnish torque for overcoming the friction of the instrument.

2. The combination in an integrating-watt-meter, of a series field, a retarding device, a counting device, and an armature in shunt to the mains, with an additional or starting winding supplied with substantially constant current and working in a substantially constant field for overcoming the friction of the instrument.

3. The combination in a meter of a friction-compensating winding or armature supplied with substantially constant current, and working in a substantially constant field.

4. The combination in a meter of a friction-compensating winding or armature supplied with substantially constant current, and working in a substantially constant adjustable field.

5. The combination in an electric meter, of a motive device, a damping-disk, magnets acting on said disk, and a starting or friction-compensating winding in the field of the said magnets.

6. The combination with an electric meter, of a damping-disk, magnets acting on said disk, and a starting or friction-compensating winding in the field of the said magnets and in series with the armature of the meter.

In witness whereof I have hereunto set my hand this 4th day of April, 1899.

WALTER C. FISH.

Witnesses:
DUGALD MCKILLOP,
HENRY O. WESTENDARP.